April 28, 1964  J. W. TOENSING  3,130,600
REMOVABLE CAM ASSEMBLY
Filed Sept. 25, 1961
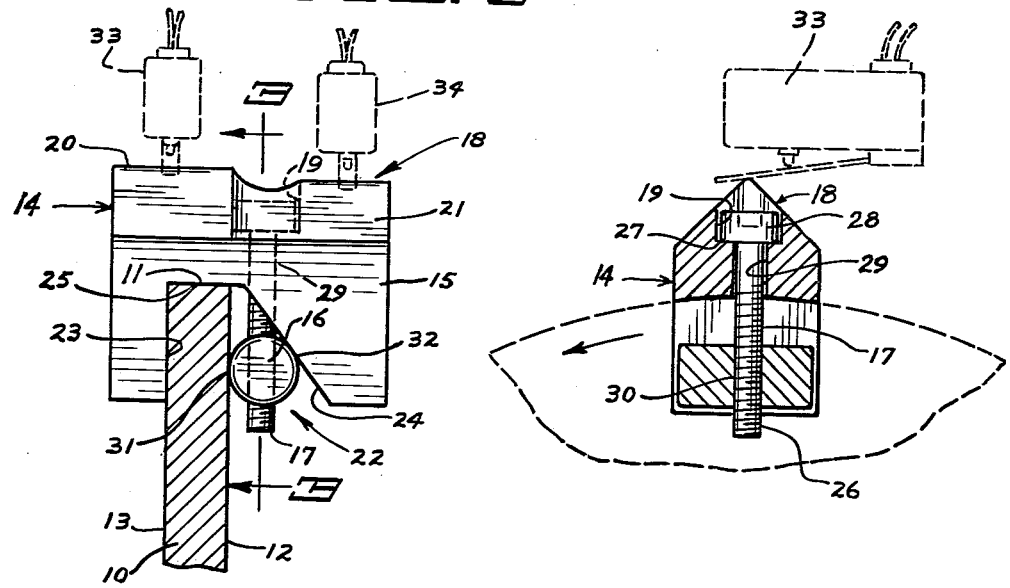
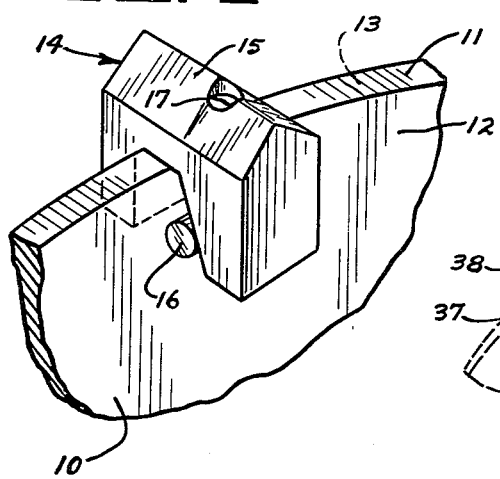
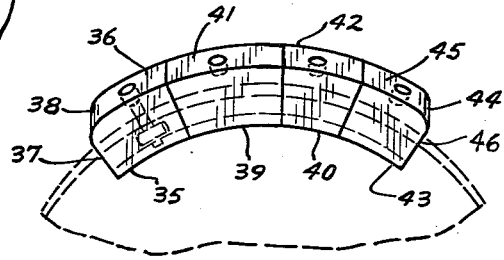
INVENTOR.
JAMES W. TOENSING
BY
ATTORNEY

United States Patent Office 3,130,600
Patented Apr. 28, 1964

3,130,600
REMOVABLE CAM ASSEMBLY
James W. Toensing, Minneapolis, Minn., assignor to Remmele Engineering, Inc., St. Paul, Minn., a corporation of Minnesota
Filed Sept. 25, 1961, Ser. No. 140,356
9 Claims. (Cl. 74—568)

This invention relates to cams and more particularly to a removable cam assembly.

Cam actuator elements are utilized extensively in the operations of electrical limit switches, air or hydraulic valves, etc. Cam actuator elements have also been used to power mechanical mechanisms where loads are modest.

Present concepts in regard to such cam actuators include a single cam disc having a cammed periphery or having cam lobes secured to the circumferential edge. In securing such cam lobes to the disc, conventional set screws are used which often mar the disc surface. When set screws are used, the cam lobe is also often shifted out of its precise location because of torque effects created by the rotation of the set screw in abutting relation with the cam disc.

A general object of this invention is to provide a cam assembly which will improve extensively upon the cam lobes as well as upon the means for attaching the lobes to the cam disc.

More specifically, an object of this invention is to provide a cam wheel mechanism, utilizing removable cam lobes for actuator elements, which will allow quick and easy change of cam settings and versatility in multiple actuation.

Another object is to provide a cam lobe which may be precisely set and then drawn tightly into place without disturbing the position of the initial precise setting.

A further object of this invention is to provide a cam lobe which is positively and precisely held to a cam wheel disc at any of an infinite number of positions without marking or marring the disc and without subsequent movement on the disc during usage.

A still further object of this invention is to provide a cam lobe of a small, simple and convenient size which will tolerate rough usage.

Another object is to provide an inexpensive cam lobe for a cam wheel disc which may be reversed in mounting orientation thereby giving alternate actuation characteristics.

Still another object is to provide an efficient cam wheel assembly which utilizes a plurality of cam lobes so as to provide a continuous cam surface for a portion of the circumference of the cam wheel.

These and other objects and advantages of this invention will more fully appear from the following description, made in connection with the accompanying drawing, wherein like reference characters refer to the same or similar parts throughout the several views and in which:

FIGURE 1 is a fragmentary perspective view of one of the cam lobes shown attached to a cam wheel disc, portions of the disc being removed beyond the broken line;

FIGURE 2 is an enlarged side view of the cam lobe mounted upon a cam disc segment shown in vertical section and having electrical limit switches shown in phantom drawing;

FIGURE 3 is a cross-sectional side view of FIGURE 2 taken on line 3—3; and

FIGURE 4 is a pictorial view of a series of cam lobes secured to a cam wheel disc showing the manner of building up continuous cam surfaces.

Referring more particularly now to FIGURE 1, a plain wheel disc, referred to generally as 10, is shown having a smooth circumferential edge 11 and flat side walls 12 and 13. Mounted upon the wheel disc 10 is a cam lobe, referred to generally as 14. Cam lobe 14, as more clearly seen in FIGURE 2, consists primarily of three basic elements; namely, a cam block 15, a wedging means such as cylindrical pin 16, and a threaded fastener such as bolt 17 which, as will be described subsequently in more detail, urges the cylindrical pin 16 into engagement with the cam block 15 and wheel disc 10 whereby to engage the two against relative movement.

Referring to FIGURE 2, the cam block 15 has an outer cam surface referred to generally as 18 which has a head bore 19 therethrough dividing the cam surface into two parts, namely, the left cam surface 20 and the right cam surface 21.

Positioned below the cam surface 18, and transversely oriented with respect thereto, is a slotted disc mounting opening, referred to generally as 22. Opening 22 in turn is defined by a vertical side wall 23 which lies in engagement with wheel disc side wall 13, an angulated side wall 24 and a curved wheel disc seat 25 joining the upper ends of side walls 23 and 24. The wheel disc seat 25 is adapted for firmly seating the circumferential edge 11 of wheel disc 10.

Positioned within the opening 22 is the cylindrical pin 16 which is threadably secured to the bolt 17. For optimum use of the present invention, it has been found that by threading the bolt through the center portion of the cylindrical pin (as seen in FIGURE 3) a balanced and even drawing force upon the pin is provided.

The bolt 17 is threaded into the pin 16 at the lower portion 26 and is seated upon annular shoulder 27 at its head end 28. Extending between angulated side wall 24 and shoulder 27 is a shank bore 29.

In the use and operation of this particular form of the invention, the cam lobe 14 is interfitted upon the peripheral edge of the wheel disc 10 as shown in FIGURE 2 with the edge 11 resting against wheel disc seat 25. The pin 16 is then positioned within the disc opening 22 between the wheel disc wall surface 12 and angulated side wall 24. Bolt 17 is then inserted into head bore 19 and shank bore 29 whereafter it is threaded into the pin 16. It may be pointed out at this time that shank bore 29 may be conveniently oversized a slight amount thereby allowing slight arcuate movement of the bolt 17 for purposes to become apparent subsequently.

With the lower end 26 of bolt 17 engaged in cylindrical pin 16 at threaded portion 30, one need merely tighten the bolt to thus draw the pin upwardly into the disc opening 22. During this operation, the pin will engage wheel disc wall 12 at 31 and angulated side wall 24 at 32. It is readily seen that further advancing of bolt 17 into pin 16 will cause the pin to be pressed against the wheel disc with greater force, ultimately securely clamping the wheel disc between vertical side wall 23 and roll pin 16. Through this novel arrangement of clamping elements, the cam lobe is more positively secured to the wheel disc but without any appreciable marring of the wheel disc side wall 12. Furthermore, by tightening the pin 16 into the opening 22, there is a natural tendency for the pin to frictionally urge the wheel disc circumferential edge 11 into engagement with disc seat 25. Although the drawing discloses an angulated side wall 24, the disc wall 12 may be angulated instead of the side wall. Thus a wedging opening 22 is formed with both of side walls 23 and 24 being vertical.

As described previously, cam surface 18 is divided by the head bore 19 whereby to provide two individual cam surfaces, 20 and 21. As seen in figure in FIGURE 2, one of the cam surfaces (20) may be provided with a higher peak riding point than the other (cam surface 21). In this manner, greater versatility is provided wherein the cam lobe 14 may be completely reversed upon disc 10 thereby alternately placing cam surfaces 20 and 21 below alternate switch mechanisms 33 and 34.

Another form of the present invention is shown in FIGURE 4. In this form of the invention, a plurality of cam lobes are secured in a manner identical to that by which cam lobe 14 was secured as described above. In this instance, four cam lobes are shown which are each of a different configuration. Cam lobe 35 is provided with a flat upper surface 36 which resolves into side wall 37 through smooth corner 38. Cam lobes 39 and 40 are substantially the same excepting cam lobe 39 is appreciably longer in arcuate length along upper surface 41 than is cam lobe 40 and its upper surface 42. Again, cam lobe 43 is similar to cam lobe 35 in that it has a smooth corner surface 44 which integrates the upper surface 45 and side wall 46. Cam lobes 35 and 43 have the smooth corner surfaces 38 and 44 respectively so that gentle actuation of a switch may be provided as the disc and cam lobes pass the switch actuator. It will now be recognized that the upper surfaces 36, 41, 42 and 45 all provide a continuous cam surface for actuation of the switch. In this form of the invention then, several cam lobes may be positioned side-by-side to form a continuous cam surface of different arc lengths depending upon the desired camming characteristic.

It is seen, then, that through the present invention a cam lobe is provided which may be accurately and securely attached to a wheel disc in such a manner that there is no marring of the wheel disc surface and which, by the very nature of the securing means, will tend to maintain the cam lobe seated against the wheel disc rather than urge it away therefrom as is prevalent with the use of set screws.

It will, of course, be understood that various changes may be made in the form, details, arrangements and proportions of the parts without departing from the scope of this invention as set forth in the appended claims.

What is claimed is:

1. A cam lobe assembly adapted for mounting on a cam wheel disc comprising, a cam block having an outwardly facing cam surface and further having a slotted opening therethrough for interfitting with the edge of a cam wheel disc, said cam block having a side wall partially defining said opening and confronting a side surface of a cam wheel disc in non-parallel relation thereto when mounted thereon, a wedging element in engagement with said side wall and adapted to frictionally engage said cam wheel side surface, and means urging said wedging element against said side wall and into wedging engagement with said cam wheel disc.

2. A cam lobe assembly adapted for mounting on a cam wheel disc comprising, a cam block having a disc opening therethrough adapted for interfitting with the edge of a cam wheel disc, said cam block also having a vertical side wall and a confronting side wall angulated with respect thereto and together therewith partially defining said disc opening, said cam block further having an outer cam surface, a wedging element riding upon said angulated side wall and adapted to slidably engage said wheel disc when said cam lobe is positioned on said wheel disc, and means urging said wedging element along said angulated side wall into wedging engagement with said cam wheel disc.

3. A cam lobe assembly adapted for mounting on a cam wheel disc comprising, a cam block having an outer cam surface and a transverse disc opening extending through said block, said block having a vertical side wall and a confronting side wall angulated with respect thereto and together therewith partially defining said disc opening, said block further having a wheel disc seat adapted to interfit with the peripheral edge of a cam wheel disc and also partially defining said transverse disc opening, a cylindrical pin wedging element riding in sliding contact upon said angulated side wall and adapted to slidably engage said wheel disc when said lobe is positioned on said wheel disc, said cam block also having a bore extending through said outer cam surface and communicating with said wheel disc opening, and a threaded fastener having a head end retained in said bore and a threaded portion extending through said bore into said disc opening and threadably engaged with said cylindrical pin whereby advancement of said threaded fastener with respect to said pin will cause said pin to ride upon said angulated side wall for ultimately wedging against a cam wheel disc.

4. A cam lobe assembly adapted for mounting on a cam wheel disc comprising, a cam block having an outer cam surface and an inner slotted disc opening therethrough, said cam block having a pair of side walls in spaced confronting relation to each other partially defining said disc opening and lying in diverging relation in a direction away from said outer cam surface, a wedging element having parallel movement in sliding contact with one of said pair of walls, and means for moving said wedging element as prescribed whereby to wedge one of said pair of side walls against a cam wheel disc when said lobe is mounted on the periphery thereof.

5. A cam wheel mechanism comprising, a cam wheel disc having an outer peripheral margin, and a plurality of cam lobes secured to the outer peripheral margin whereby to form a continuous cam surface, each of said cam lobes having a cam block with an outer cam surface, an angulated side wall partially defining a slotted transverse disc opening therethrough, a wedging element adapted for parallel sliding movement along said angulated side wall, and threaded fastener means for drawing said wedging element into firm engagement with both said angulated side wall and said outer peripheral margin.

6. A cam lobe assembly adapted for mounting on a cam wheel disc having a smooth periphery and sides comprising, a cam block having an outer cam surface and an inner slotted disc opening therethrough, said opening having a seat for engaging the periphery of said disc and a side wall adapted to be positioned in confronting relation to one side of said cam wheel disc whereby to form a radially outwardly convergent space therebetween, a wedging element positioned in said convergent space, and means for advancing said wedging element into wedging engagement with said opening side wall and said disc side.

7. A cam lobe assembly as set forth in claim 6 wherein said wedging element comprises, a cylindrical pin positioned at substantially right angles to the advancing means whereby said pin is caused to have balanced sliding contact on either side of said advancing means when wedging said side wall and said disc side.

8. A cam lobe assembly adapted for mounting on a cam wheel disc having a smooth periphery and sides comprising, a cam block having an outer cam surface and an inner slotted disc opening therethrough, said cam block having a seat for engaging the periphery of such a disc, the disc opening being wider than the disc when said cam block is mounted peripherally thereon, respective side walls thereof being angularly arranged whereby to form a radially outwardly divergent space therebetween, a wedging element positioned in said disc opening, and means inserted through said outer cam surface and advanceably engaging said wedging means whereby during use said wedging element may be positioned in said divergent space and into wedging engagement with said respective side walls.

9. A cam lobe assembly adapted for mounting on a cam wheel disc comprising, a cam block having an inner slotted disc opening therethrough adapted for interfitting with the edge of a cam wheel disc, said cam block also having a vertical side wall and a confronting side wall angulated with respect thereto and together therewith partially defining said disc opening, said cam block further having an outer cam surface, a wedging element riding upon said angulated side wall and adapted to slidably engage said wheel disc when said cam lobe assembly is positioned on said wheel disc, and means adapted to urge said wedging element in a radial direction along said angulated side wall into wedging engagement with a cam wheel disc, said wedging element being symmetrically positioned with respect to said means for urging said wedging element along the angulated side wall, whereby the force transmitted by said wedging element is balanced to maintain accurate positioning of the cam lobe assembly thereon.

No references cited.